United States Patent [19]

Graham

[11] 4,241,484
[45] Dec. 30, 1980

[54] METHOD FOR ASSEMBLING A FUEL PUMP AND MOTOR

[75] Inventor: Kenneth A. Graham, Birmingham, Mich.

[73] Assignee: Chrysler Corporation, Highland Park, Mich.

[21] Appl. No.: 958,572

[22] Filed: Nov. 7, 1978

Related U.S. Application Data

[62] Division of Ser. No. 822,585, Aug. 8, 1977, Pat. No. 4,195,971.

[51] Int. Cl.³ .................. B23P 15/00; F04B 35/04
[52] U.S. Cl. .................. 29/156.4 R; 29/404; 29/407; 29/593; 29/596; 324/158 MG
[58] Field of Search .................. 29/156.4 R, 407, 593, 29/404, 705, 596; 417/206, 371, 360, 410; 324/158 MG

[56] References Cited

U.S. PATENT DOCUMENTS

| | | | |
|---|---|---|---|
| 1,834,754 | 12/1931 | Whaley | 418/182 |
| 2,049,797 | 8/1936 | Bochmann et al. | 418/182 |
| 2,130,299 | 9/1938 | Ernst | 417/206 |
| 2,257,349 | 9/1941 | Sherwood | 29/156.4 R |
| 2,784,708 | 3/1957 | Hill et al. | 417/206 |
| 2,825,286 | 3/1958 | White | 417/371 |
| 3,015,875 | 1/1962 | Skuta | 29/593 |
| 3,291,059 | 12/1966 | Werra | 418/206 |
| 3,864,822 | 2/1975 | Eash et al. | 29/732 |
| 3,889,360 | 6/1975 | Meili | 29/593 |

*Primary Examiner*—Daniel C. Crane

*Attorney, Agent, or Firm*—Newtson & Dundas

[57] ABSTRACT

A compact pump and motor assembly adapted for use as a fuel controller for an internal combustion engine fuel metering system. The assembly contains an electric motor, an interface housing assembly at one end of the electric motor and a pump housing assembly disposed on the side of the interface housing assembly opposite that of the motor. The motor shaft extends through the interface housing into a pilot hole in the pump housing and drives a pumping means contained within a pumping chamber defined by the pump housing and the interface housing. An inlet port, an outlet port, and a return port are provided in the pump housing. An inlet passage extends from the inlet port through the gear pump housing and the interface housing into a vapor separation chamber contained within the casing of the motor, the motor being of the wet type. A passage in the interface housing extends from the vapor separation chamber to the inlet of the pumping chamber. An outlet passage in the pump housing extends from the outlet of the pumping chamber to the outlet port. A passage shunting the pumping chamber extends in the interface housing and the pump housing from the separation chamber to the return port, and contained therein is a low pressure regulator valve which regulates pressure in the vapor separation chamber. A further passage extends in the pump housing from the pumping chamber outlet to the return port and a valve assembly is contained therein for diverting a portion of the pump output to the return port under certain conditions at the pumping chamber outlet.

1 Claim, 24 Drawing Figures

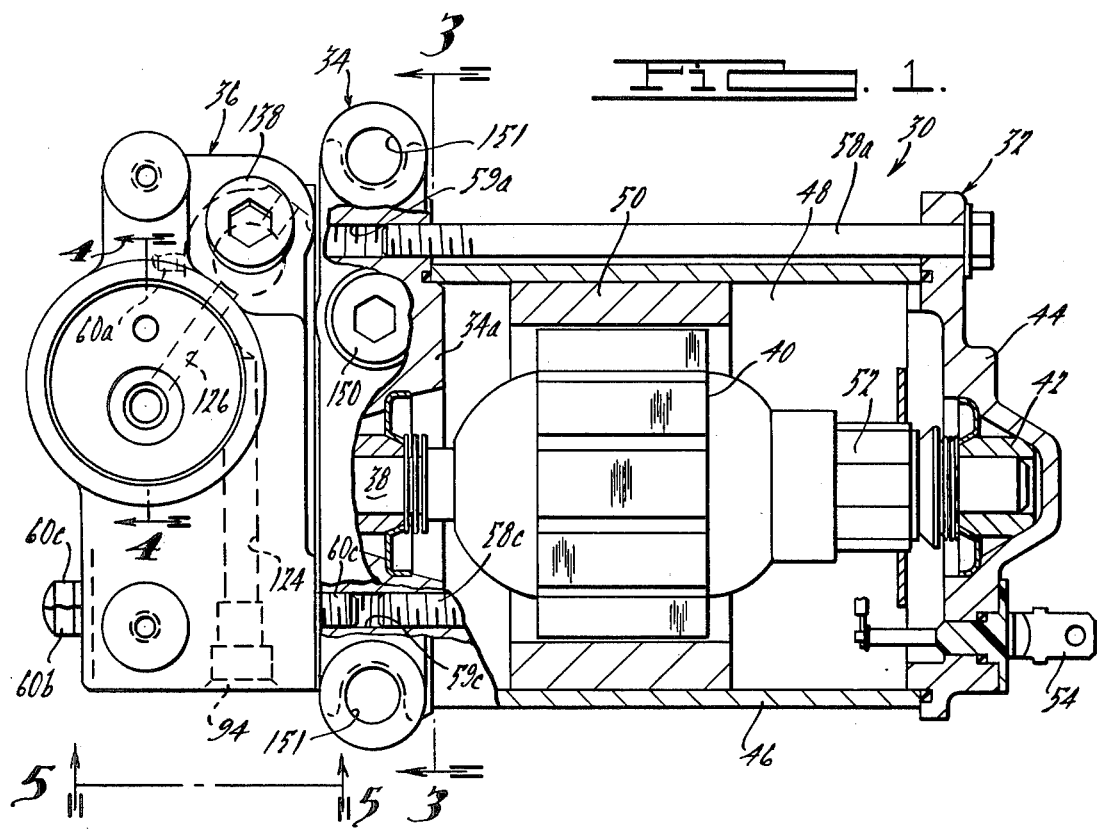
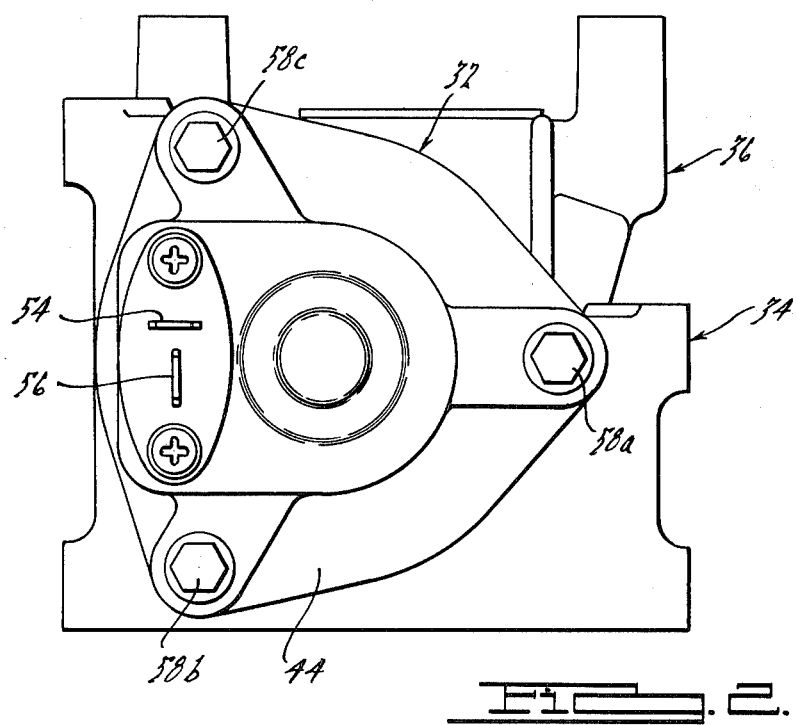

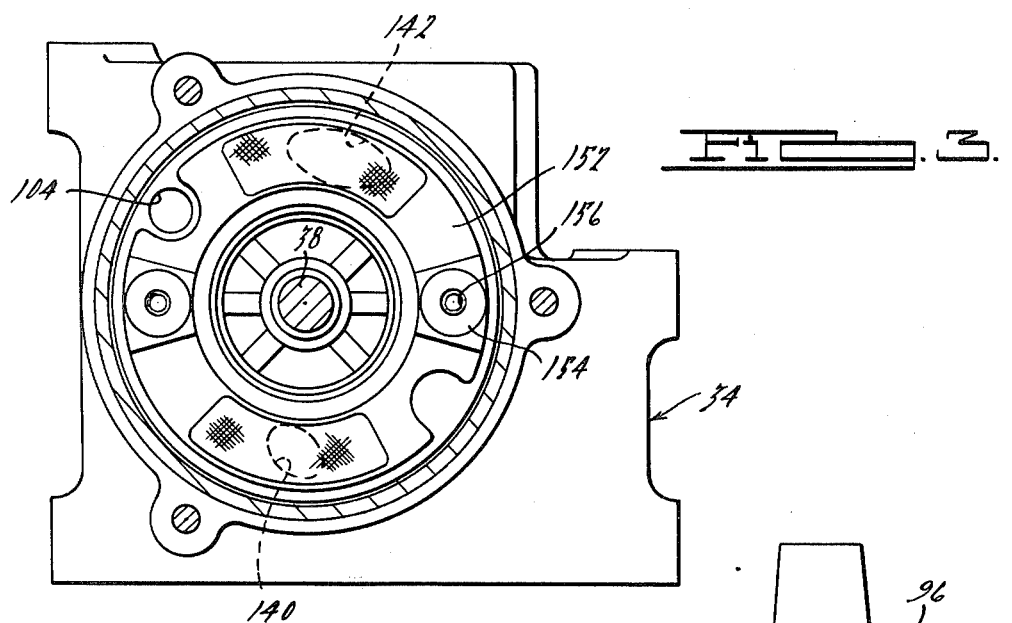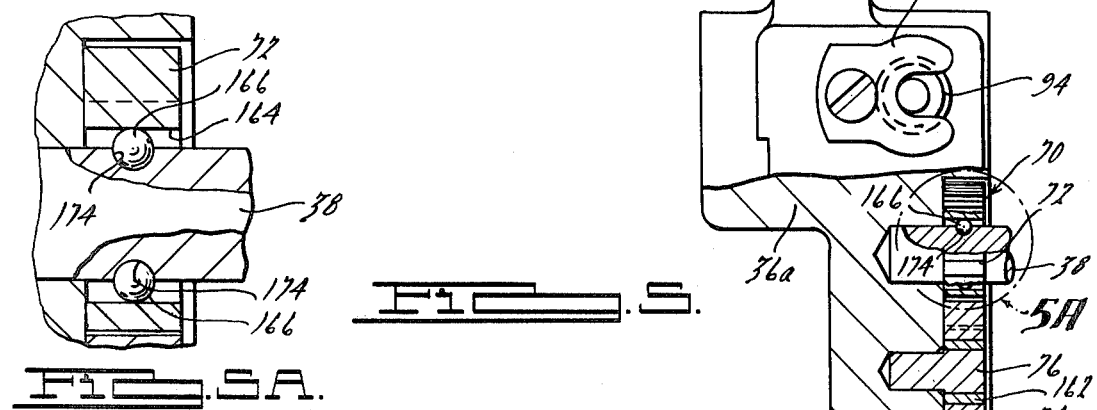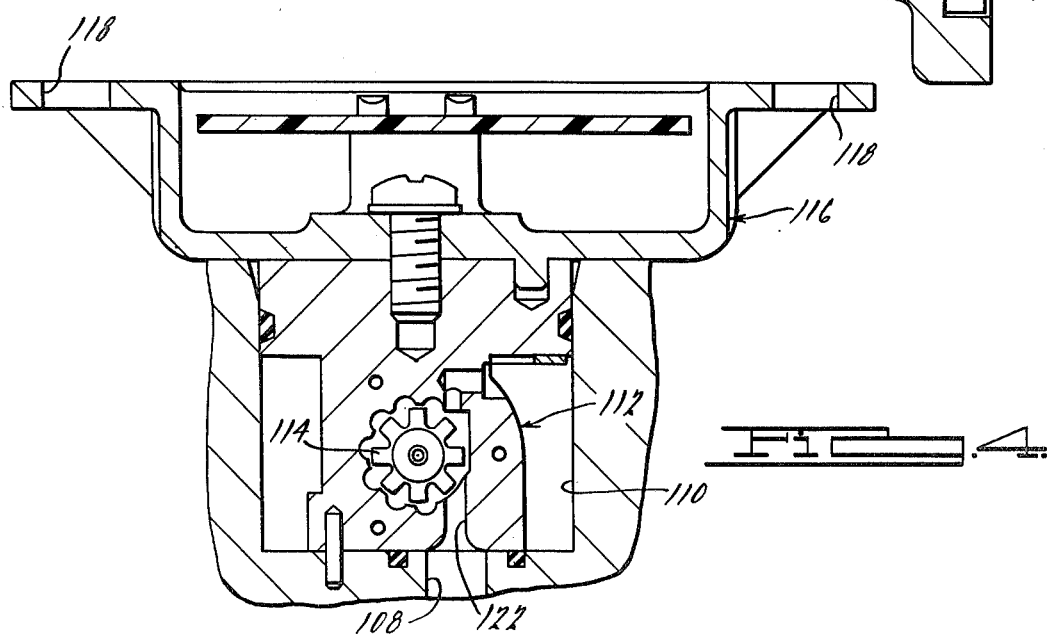

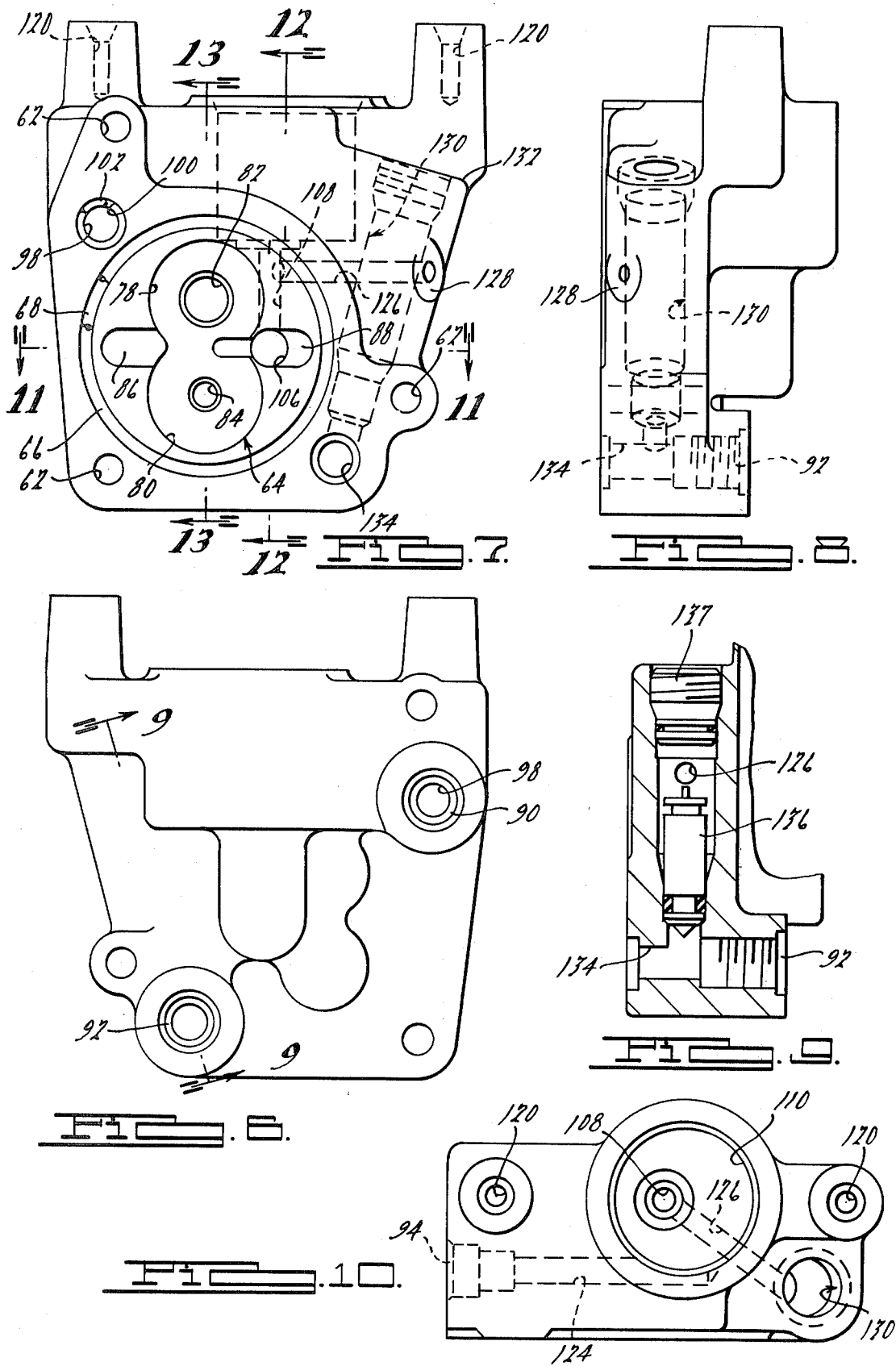

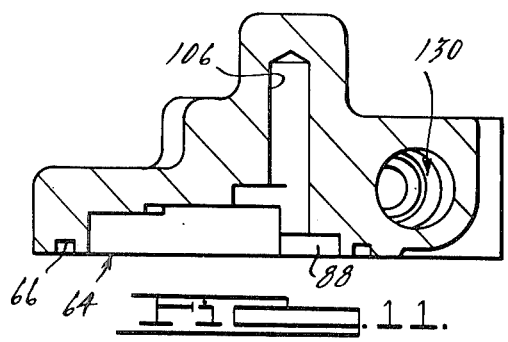
FIG. 11.
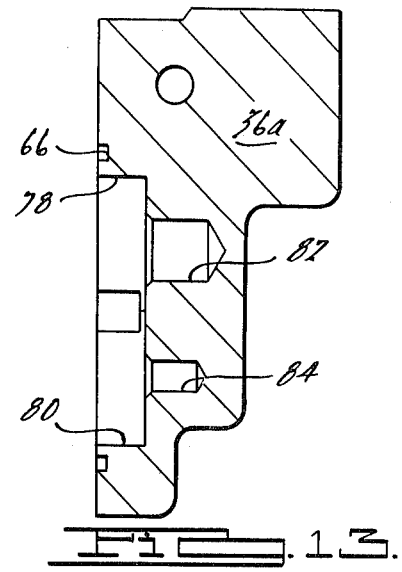
FIG. 13.
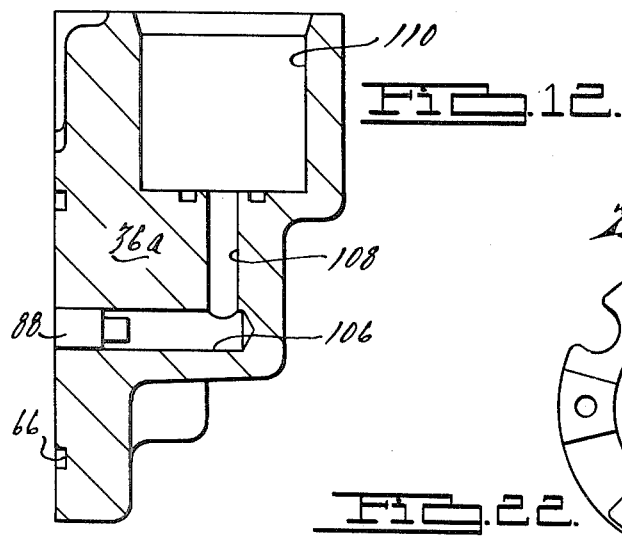
FIG. 12.
FIG. 22.
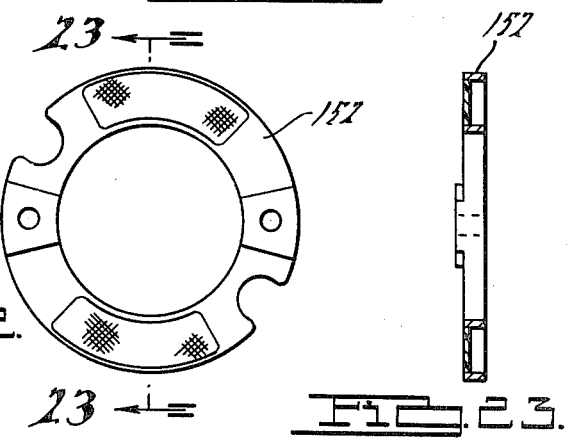
FIG. 23.
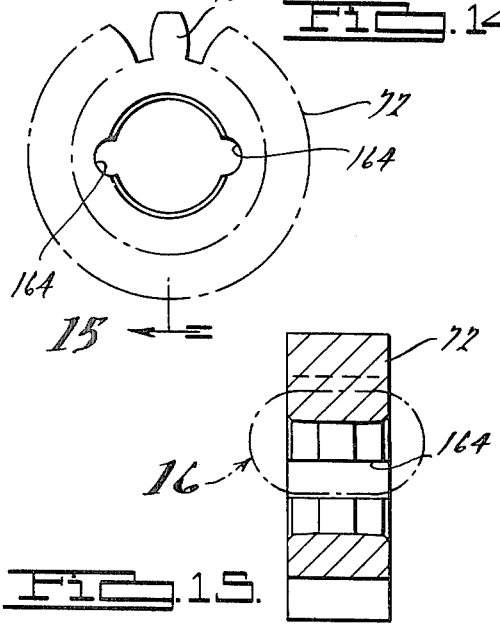
FIG. 14.
FIG. 15.
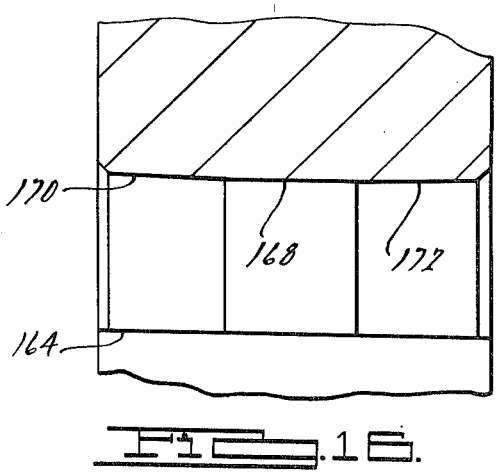
FIG. 16.

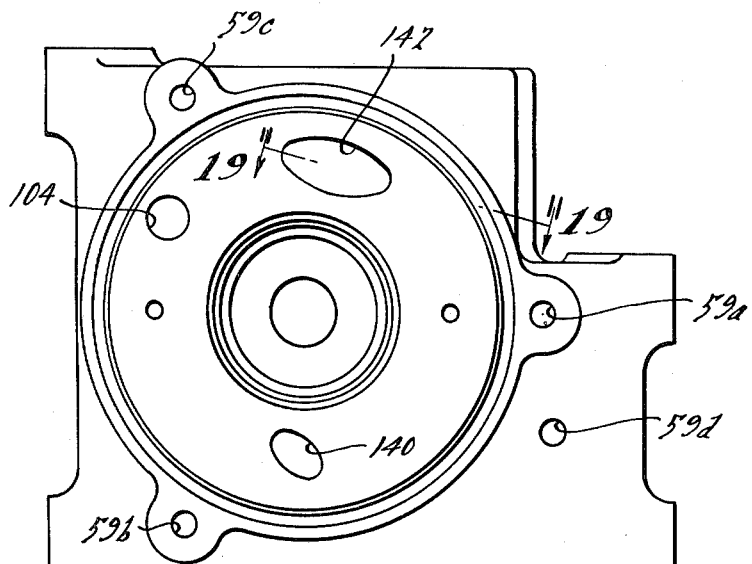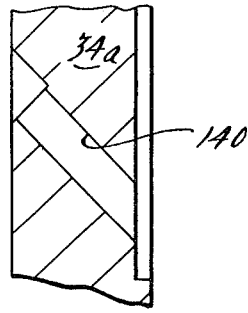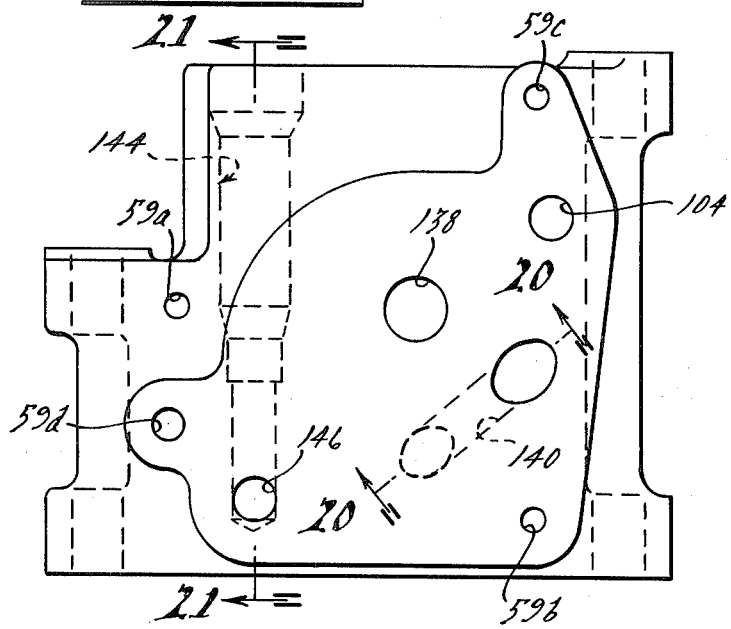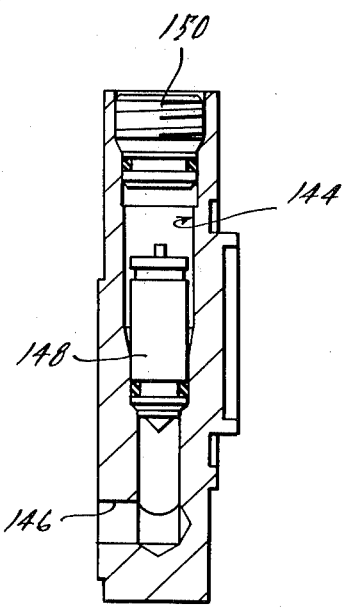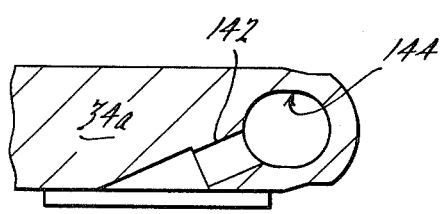

METHOD FOR ASSEMBLING A FUEL PUMP AND MOTOR

This is a division of application Ser. No. 822,585, filed Aug. 8, 1977, now U.S. Pat. No. 4,195,971, issued Apr. 1, 1980.

BACKGROUND AND SUMMARY OF THE INVENTION

This invention pertains to a pump and motor assembly which is particularly adapted for use as a fuel controller for an internal combustion engine fuel metering system.

The present invention is concerned particularly with providing a compact pump and motor assembly which may be used in an electronic fuel metering system of the type disclosed in applicant's co-pending application Ser. No. 798,715 filed May 19, 1977, entitled "Fuel Circuit for an Internal Combustion Engine."

Briefly, an electronic fuel metering system of the type disclosed in the co-pending application operates an electric motor driven control pump in such a manner the pump delivers the correct amount of fuel required for operation of the engine. It has been discovered to be advantageous to mount the fuel pump and motor assembly as close as possible to the point at which the fuel is distributed for mixture with air ingested by the engine to form the combustible mixture. In the typical automotive vehicle, this means that the fuel pump and motor assembly should be mounted directly on the engine, for example, within the confines of the usual air filter housing. In order to make such mounting feasible it becomes desirable to make the pump and motor assembly as compact as possible. The present invention in one respect is concerned with providing such a pump and motor assembly. The invention is also directed to an improved assembly which utilizes fewer parts, is more economical, and greatly minimizes the adverse effect of once-per-revolution friction variations on flow variation.

Features, advantages and benefits of the invention will be seen in the ensuing description and claims which should be considered in conjunction with the accompanying drawings which illustrate an examplary but presently preferred embodiment according to the best mode presently contemplated in carrying out the invention.

BRIEF DESCRIPTION OF THE DRAWINGS

FIG. 1 is a plan view having portions broken away and removed illustrating a pump and motor assembly embodying principles of the present invention.

FIG. 2 is a right-hand end view of the assembly shown in FIG. 1.

FIG. 3 is a sectional view taken substantially in the direction of arrows 3—3 in FIG. 1.

FIG. 4 is a fragmentary sectional view on a slightly enlarged scale taken in the direction of arrows 4—4 in FIG. 1 and showing additional portions of the assembly.

FIG. 5 is a view partly in section taken in the direction of arrows 5—5 in FIG. 1.

FIG. 5A is an enlarged view taken in circle 5A in FIG. 5.

FIG. 6 is a left-hand end view of FIG. 1 illustrating one of the elements of the assembly by itself.

FIG. 7 is a view of FIG. 6 rotated 180° about a vertical axis.

FIG. 8 is a right-hand view of FIG. 7.

FIG. 9 is a sectional view taken in the direction of arrows 9—9 in FIG. 6 and showing additional elements.

FIG. 10 is a top plan view of FIG. 7.

FIG. 11 is a sectional view taken in the direction of arrows 11—11 in FIG. 7.

FIG. 12 is a sectional view taken in the direction of arrows 12—12 in FIG. 7.

FIG. 13 is a sectional view taken in the direction of arrows 13—13 in FIG. 7.

FIG. 14 is an axial end view of one of the elements of the assembly shown by itself.

FIG. 15 is a sectional view taken in the direction of arrows 15—15 in FIG. 14.

FIG. 16 is an enlarged fragmentary view taken within the confines indicated by the numeral 16 in FIG. 15.

FIG. 17 is a view taken in the same direction as the view of FIG. 3 but with certain elements removed.

FIG. 18 is a view of FIG. 17 rotated 180° about a vertical axis.

FIG. 19 is a sectional view taken in the direction of arrow 19—19 in FIG. 17.

FIG. 20 is a sectional view taken in the direction of arrows 20—20 in FIG. 18 and showing additional elements.

FIG. 21 is a sectional view taken in the direction of arrows 21—21 in FIG. 18 and showing additional elements.

FIG. 22 is an axial end view of another element of the assembly shown by itself.

FIG. 23 is a sectional view taken in the direction of arrows 23—23 of FIG. 22.

DESCRIPTION OF THE PREFERRED EMBODIMENT

FIG. 1 illustrates a pump and motor assembly 30 embodying principles of the present invention and comprising three principal sections which are an electric motor assembly 32, an interface housing assembly 34 and a pump housing assembly 36. These three sections are assembled together axially with interface housing assembly 34 being disposed between electric motor assembly 32 and pump housing assembly 36.

Electric motor 32 is a generally conventional wet type motor which may be used in gasoline fuel systems. Motor 32 comprises an armature shaft 38 having an armature structure 40 disposed thereon. The right-hand end of shaft 38 as viewed in FIG. 1 is journaled by means of a spherical journal bearing 42 in an end closure member 44 which encloses the right-hand end of the assembly. The opposite end of shaft 38 is similarly journaled in the housing proper 34a of interface housing in a manner which will be explained in detail later. A cylindrical casing 46 extends between end closure member 44 and interface housing 34a around armature 40 to thereby define a chamber, hereinafter referred to as the vapor separation chamber 48 for reasons which will be subsequently explained. A suitable magnetic field structure 50 is disposed on the inner wall of casing 46 around armature 40 to provide the required magnetic field for the motor. The commutator is indicated at 52 and electric power is supplied via brushes (not shown) engaging commutator 52 which are connected to respective electric terminals 54, 56 which extend through but are insulatingly supported on end closure member 44. The components constituting electric motor 32 are held in assembled position on interface housing 34a by means of three through bolts 58a, 58b, 58c passing through clearance holes in member 44 to engage tapped holes 59a, 59b, 59c, respectively extending completely through interface housing 34a as indicated. It will be appreciated therefore that when electrical power is supplied to terminals 54 and 56, the armature shaft 38 is caused to rotate and thereby operate the pumping mechanism hereinafter described, the motor speed being variable as a function of the electrical input to the terminals.

Attention is next directed to FIGS. 4 through 14 which illustrate pump housing assembly 36 in detail. Assembly 36 comprises a pump housing proper 36a having a planar right-hand (as viewed in FIG. 1) face disposed against a corresponding left-hand face of interface housing 34a. Assembly of the two housings is accomplished by means of three through bolts 60a, 60b, 60c (FIG. 1) which pass respectively through three clearance holes 62 in housing 36a to engaged tapped holes 59d, 59b, 59c, respectively in housing 34, as shown. A pumping chamber generally indicated by the numeral 64 is fashioned in said right-hand face of housing 36a and is bounded by a circular groove 66. A compressible resilient O-ring seal 68 (FIG. 7) which is impervious to the pumped fluid is lodged in groove 66 to provide for a seal between the two housings 34a, 36a around the pumping chamber 64. Pumping chamber 64 is configured for a gear type pumping mechanism 70 (FIG. 5) comprising a pair of meshed gears 72 and 74 respectively. Gear 72 is the driving gear which is keyed to the protruding end of armature shaft 38. Gear 74 is the driven gear which is journaled on a stub shaft 76. Pumping chamber 64 is formed by two intersecting circular gear recesses 78 and 80 respectively for gears 72 and 74 respectively, the recesses being formed in the face of housing 36a which is disposed against housing 34a. A pilot hole 82 is fashioned concentrically with recess 78 to provide a pilot for the free end of armature shaft 38 during assembly of the components as will be explained in greater detail later. A similar pilot hole 84 concentric with recess 80 is provided for stub shaft 76. As viewed in FIG. 7 an inlet 86 is provided on the left-hand side of the intersection of the two recesses 78 and 80 and an outlet 88 is provided on the right-hand side. The pumping chamber is thereby defined by a pair of axial end walls, one each provided by each housing 34a, 36a, and is bounded peripherally by a peripheral wall defined by the two intersecting circles. It will therefore be appreciated that with this arrangement fluid is pumped from inlet 86 to outlet 88 by means of pumping mechanism 70 when motor 32 is operated to rotate shaft 38.

Housing 36a is also fashioned with three ports to which external lines are adapted to be connected. An inlet port 90 is intended to be connected to a source of fuel, such as a fuel tank, via an inlet supply line (not shown) which connects to inlet port 90. Return port 92 is intended to return fluid to the tank via a return line (not shown) which connects to return port 92. Outlet port 94 is intended to be connected to the distribution system of the engine via an outlet line (not shown) which connectss to outlet port 94. Connection of the lines to the ports may be accomplished in any of the usual ways. One way is by tapping the ports, as is the case for ports 92 and 90, and using threaded line fittings. Another way is to flange the line and use a screw and retainer indicated at 96 for port 94 to hold the flanged line in place.

Inlet port 90 leads to a passage 98 which extends through housing 36a parallel to the axis of the pump and motor assembly 30. As can be seen in FIG. 7 a circular groove 100 is provided in the right-hand face of housing 36a around passage 98 to receive an O-ring seal 102 which seals around the passage between the two housings 34a, 36a. Passage 98 forms the beginning of a passage which is continued through housing 34a by the passage 104 (see FIG. 18) and which leads to vapor separation chamber 48.

In pump housing 36a outlet 88 of the pumping chamber connects to outlet port 94 by means of several interior passage segments. These several segments include an axial passage 106 leading directly from outlet 88 and a radial passage 108 which intersects passage 106 as shown in FIG. 12. Passage 108 in turn leads to an enlarged circular bore 110 which forms a flow-transducer-receiving receptacle for a fluid flow transducer assembly 112 shown only in FIG. 4. Flow transducer assembly 112 may be generally of the type shown in U.S. Pat. No. 3,814,935 dated June 4, 1974 and comprises a rotatably mounted paddle wheel 114 which rotates at a velocity corresponding to the flow rate of fluid which is directed generally tangentially against the periphery of the segments of the paddle wheel. A light source and light responsive pick-up (not shown) are disposed to monitor the velocity of the paddle wheel and develop an electrical signal for use in the electronic fuel metering system with which the pump and motor assembly may be used. Electrical circuitry is associated with this arrangement and is conveniently contained on an electronic circuit module package 116 which is disposed exteriorly of the housing 36 over the receptacle 110 and transducer 112 contained therein, the package being fastened to the latter. The assemblage consisting of the flow transducer 112 and the electronic package 116 is secured to housing 36a by means of screws (not shown) which pass through holes 118 in the electronic package 116 to engage corresponding holes 120 formed in upstanding bosses on the top of housing 36a. The fluid passage through the flow transducer is indicated by the reference numeral 122 with fluid after passing through the flow transducer being conducted into the free space within the interior of the receptacle 110 around the outside of the transducer body. Communication from there to outlet port 94 is established by means of a passage 124 extending from port 94 to tangentially intercept the wall of receptacle 110. As can be seen in the drawings, appropriate seals and locating means are provided for flow transducer assembly 112 and associated circuit package 116.

Return port 92 is also connected with outlet 88 by means of internal passages in housing 36a. Passage 108 is intersected just below its point of intersection with receptacle 110 by means of a passage 126 which is formed as a bore extending from the exterior boss 128. After boring, the passage 126 is closed off by means of a suitable closure at boss 128. Passage 126 intercepts a further passage, generally 130, which is formed as a bore and sequence of counterbores from the surface 132 of housing 36a. As will be subsequently explained, passage 130 is shaped in this manner to receive an orifice bypass valve assembly which is utilized to divert a portion of the pump output from outlet port 94 to return port 92 in response to selected conditions occurring at the outlet 88 of the pumping chamber 64. Passage 130 intercepts an axial passage 134 which extend through housing 36a from return port 92. As shown in FIG. 9, the orifice bypass valve assembly 136 is assembled into passage 130 and the open upper end of passage 130 above the point at which passage 126 intersects is closed by means of a closure 137. While further details of the manner of operation of valve assembly 136 will be explained later suffice it to say for the present that the valve assembly operates to selectively divert a portion of the pump output back to the tank via the return port under certain conditions at the outlet 88 of the pumping chamber.

Consideration is now directed to details of interface housing 34a as shown in FIGS. 17 through 21. The interface housing proper 34a contains, as explained above, the threaded attaching holes for the bolts 58a, 58b, 58c, 60a, 60b, 60c which respectively hold electric motor assembly 32 and pump housing assembly 36 thereto in assembled relation. Additionally, housing 34a contains an axial hole 138 for the motor armature shaft 38 which extends through housing 34a and is configured to receive the journal bearing and retainer used to journal the armature shaft in passing through hole 138. As explained earlier the axial passage 104 through housing 34a continues the inlet passage from inlet port 90 into the vapor separation chamber 48. The purpose of vapor separation chamber 48 is to provide a solid head of liquid fuel to the inlet of the pumping chamber which is free from entrained vapor. Accordingly, the skewed passage 140 is provided through housing 34a extending from the lower level of vapor separation chamber 48 to communicate with inlet 86 of pumping chamber 64. In order to return excess vapor and excess liquid entrained with vapor to the tank a low pressure regulator valve assembly is incorporated into interface housing assembly 34. For this purpose, a passage 142 in housing 34a extends from the upper head space of the vapor separation chamber to intercept a vertical passage indicated generally at 144. The vertical passage is formed as a bore and series of counterbores in much the same manner as was passage 130 in housing 36a to accommodate the valve assembly which is disposed therein. The lower end of passage 144 intercepts an axial passage 146 which is continued by the passage 134 in housing 36a to lead to return port 92. A suitable groove and O-ring seal are provided in housing 36a around passage 134 to provide for sealing between the two housings 34a, 36a around the passage. As shown in FIG. 21, the low pressure regulator valve assembly 148 is lodged in passage 144 at a level below that at which passage 142 intersects and the open upper end of passage 144 is closed by a closure 150. The low pressure regulator valve assembly 148 is essentially a normally closed pressure relief valve which opens when the pressure acting on the valve assembly as communicated from vapor separation chamber 48 exceeds the valve setting at which point the valve opens to conduct vapor and liquid entrained with vapor back to the tank via return port 92. It should also be pointed out that housing element 34a is provided with a pair of mounting holes 151 via which bolts (not shown) may be passed to secure the assembly to support structure forming the base of the air cleaner housing of the engine with which the pump and motor assembly may be used.

It is also preferable to include a fine mesh filter screen to filter any contaminating particles which may have entered the vapor separation chamber so that these are not transmitted through to either of the pumping mechanism or to the valve assembly 148 where they might interfere with the proper operation of these respective components. Accordingly, as shown in FIG. 3 such a filter screen 152 in the form of an assembly is secured to the right-hand face of interface housing 34a by means of retention elements 154 which engage a pair of diametrically opposite mounting studs 156 which are fashioned integrally with housing 34a. Details of the screen construction are shown in FIGS. 22 and 23.

Details of the preferred construction for gear 72 are shown in FIGS. 14, 15 and 16. Gear 72 comprises a series of teeth 159 distributed around the outer periphery thereof and a central axial bore comprised of three sections 168, 170, and 172. A pair of diametrically opposed axial slots 164 extend the full length of the gear bore and provide for assembly of the gear to armature shat 38 as will be explained. The purpose of the three sections 168, 170 and 172 is to permit gear 72 to rock slightly on armature shaft 38 but without allowing the gear to exceed a specified concentricity limit on the armature shaft. With such a capability, once-per-revolution friction variation is minimized, and correspondingly fluid flow variation. The intermediate section 168 is parallel to the axis of the gear while the end sections 170 and 172 taper slightly radially outwardly (about 1°) away from intermediate section 168. The tapers are slightly exaggerated in the drawing for illustration. With this design, th concentricity of the gear on the shaft is controlled by the diameter of the intermediate section while the amount of possible rock is determined, for a given diametrical clearance between shaft 38 and intermediate section 168, by the axial length of intermediate section 168, tapered sections 170, 172 having sufficiently large tapers to preclude them from contacting the shaft.

Driven gear 74 is similarly endowed with a limited rocking capability within a desired concentricity limit on stub shaft 76. However, the construction is somewhat different. A journal bushing 162 (FIG. 5) such as a molded plastic bushing of suitable plastic material, is pressed into the bore of the metal gear. The inner wall of the bushing is constructed with an intermediate axial section and tapered end sections to provide the rocking capability of the gear on the stub shaft within a desired concentricity limit. By using this construction and making stub shaft 76 of a smaller diameter than that of the armature shaft, a common metal gear blank can be used for both gears 72, 74 thereby simplifying manufacturing operations and equipment. Such a gear blank can have a straight axial bore containing the axial slots 164. Bushing 162 can be pressed into the bore to form the driven gear. The tapers 170, 172 can be ground in a blank to form the drive gear. It is advantageous to form the gear blanks from powdered metal using existing techniques.

The two gears are dimensioned axially for a close axial running fit within the pumping chamber and the capability for the gears to rock on their respective shafts is advantageous in securing as close a running axial fit as possible between the flat axial ends of the gears and the corresponding flat axial end walls of the pumping chamber. Where the capacity of the pump is to be reduced, the axial dimensions of the gears and also of the pumping chamber may be correspondingly reduced. In such an event it may be possible to eliminate the tapers while still maintaining the requisite degree of concentricity and of capability for rocking of the gears on their shafts.

Having therefore described the details of the gears and of the pumping chamber, it is now appropriate to consider the manner in which the constituent components are assembled together to form the pump and motor assembly. The preferred procedure is to construct the motor assembly 32 and assemble the interface housing member 34 thereto by means of the through-bolts 58a, 58b, 58c. This having been completed, the drive gear 72 can be keyed to the protruding end of armature shaft 38 which protrudes through interface housing 34. Details can be seen in FIG. 5A. A pair of hemispherically shaped, diametrically opposed dimples 174 have been provided in armature shaft 38. Gear 72 is keyed to the armature shaft for rotation therewith by means of ball bearings 166. The ball bearings may be seated in dimples 174 and kept therein by either magnetizing the bearings or by using a dab of lubricant. With the bearings in place, gear 72 is inserted onto the free end of the armature shaft with slots 164 in circumferential alignment with bearings 166 to lodge the latter within the former as the gear is more fully inserted onto the shaft. Pump housing 36a can now be assembled to interface housing 34a. Stub shaft 76 and driven gear 74 are assembled to pump housing 36a preparatory to assembling of the latter to interface housing 34a. The two housings 36a, 34a are axially and radially aligned generally with each other and are moved axially toward each other to a position where the free end of armature shaft 38 pilots on pilot hole 82 in pump housing 36a, the pilot diameters of pilot hole 82 providing for as close a fit with the diameter of shaft 38 as practical. If the two gears 72, 74 are not correctly oriented for meshing engagement, the two elements 34a, 36a may be slightly manipulated to bring the gear teeth into position where they can mesh. Once this is achieved continued further displacement of the two elements 34a, 36a toward each other will cause the gears to more fully mesh and the end of shaft 38 to more fully engage pilot 82. It should be apparent that once the gear has been inserted onto the armature shaft over the ball bearings and the two housings brought together, it is impossible for the ball bearings to become dislodged form the dimples. The through-bolts 60a, 60b and 60c can now be tightened in appropriate holes in the interface housing 34a to secure the assembly together. It has been found desirable to operate the motor while the bolts 60a, 60b, and 60c are being tightened while simultaneously watching motor current on an ammeter connected with the leads to the motor. The bolts may be tightened in sequence until predetermined amperage limits are noted. This insures that the best possible alignment has been obtained and that tendencies for binding and seizing have been minimized. As the two housings 34a, 36a are being engaged, the sealing gaskets disposed therebetween are being compressed to provide appropriate sealing for the fluid connections between the two. This procedure establishes a close tolerance for concentricity between the periphery of the teeth of gear 72 and the recess 78 forming the peripheral wall of the pumping chamber within which gear 72 is disposed. In conjunction, the rocking capability of gear 72 on shaft 38 promotes the maximum possible parallelism between the end walls of the pumping chamber and the flat axial ends of the gears. Thus, because of the close control and tolerances and fit an efficient pump construction is achieved which can develop satisfactory outlet pressures, and flow quality, and which does not have excessive pump leakage but most importantly will provide minimum rotational-friction-caused speed variations, and hence minimum rotational-friction-caused flow variations.

Details of the operation of the pump and motor assembly in an electronic fuel metering system may be obtained by referring to the above copending application. Briefly, the low pressure regulator valve assembly 148 controls the pressure in vapor separation chamber 48, and hence at the inlet of the pumping chamber, as explained above. The pumping rate is a function of the motor armature shaft speed as electrically controlled. The outlet port is connected to a pressure regulator and fuel spray bar assembly and the pressure at the outlet of the pumping chamber is a function of the characteristics of the pressure regulator and fuel spray bar design. Generally, the outlet pressure increases as the pumping rate increases. The orifice bypass valve assembly 136 is normally closed, but opens in response to predetermined outlet pressures at the pumping chamber outlet to divert a portion of the pump output back to the tank via the return port. Flow through the valve must pass through an orifice and the proportions of fuel which is diverted is a function of the total flow output of the pump. Preferably, the valve assembly 136 is designed to close at a predetermined pressure above that at which it opened so that at and near maximum engine fuel demand, diversion of the pump output is arrested to cause the entire pump output to be fed to the engine for consumption.

In actual life testing of prototype models, it has been found that performance and durability requirements for automotive usage are readily attained. Furthermore, the pump and motor assembly is compact in size and can be conveniently installed on an engine, as inside the air filter housing structure for example. Connection of external lines is facilitated because the ports are all located in housing 36a at one end of the assembly. Also, fuel handling requirements are met without the more complicated design of having to use a slipper type pump with its large number of small parts. Thus, the invention provides a compact size and construction which meets the functional requirements of an automotive fuel metering system.

What is claimed is:

1. In the method of making a compact pump and motor assembly adapted for use as a fuel controller for an internal combustion engine fuel metering system wherein the assembly comprises a pumping chamber jointly defined by a pair of separate members and having axially spaced end walls perpendicular to a longitudinal axis of the assembly, one end wall being in one of said members and the other end wall being in the other of said members, and a peripheral wall, defined, when viewed axially, by a pair of intersecting circles, said peripheral wall being in said other member, and wherein the assembly further comprises a pair of meshed gears within said pumping chamber, one of which is disposed on an end of the motor armature shaft extending into the pumping chamber and has a close peripheral running fit with that portion of said peripheral wall defined by one of said circles and the other of which is journaled solely on said other member for rotation with close peripheral running fit within that portion of said peripheral wall defined by the other of said circles, said two gears having close axial running fits with said two end walls, and wherein a pilot hole is provided in said other end wall concentric with that portion of said chamber peripheral wall defined by said one circle and said motor armature shaft is provided with sufficient length so that the end thereof on which said one gear is disposed extends completely through said one gear and pilots on said pilot hole, and further wherein said two members are axially secured in assembly by a plurality of threaded fasteners, the improvement which comprises operating the motor and pump, and with the motor and pump operating, tightening the threaded fasteners until predetermined motor current draw occurs.

* * * * *